United States Patent [19]

Persson

[11] 4,024,948
[45] May 24, 1977

[54] CONVEYOR TRACK APPARATUS FOR LOGS

[76] Inventor: Jan Persson, Gardet, Acklinga, 522 00 Tidaholm, Sweden

[22] Filed: June 17, 1976

[21] Appl. No.: 697,218

Related U.S. Application Data

[63] Continuation of Ser. No. 615,057, Sept. 19, 1975, abandoned, which is a continuation of Ser. No. 501,074, Aug. 27, 1974, abandoned.

[30] Foreign Application Priority Data

Aug. 31, 1973 Sweden .............................. 73118556

[52] U.S. Cl. .............................. 198/796; 198/365; 144/242 D
[51] Int. Cl.² ......................................... B65G 47/94
[58] Field of Search .......... 198/362, 365, 633, 636, 198/637, 645, 796; 214/52 R, 62 A; 144/242 D, 242 R

[56] References Cited

UNITED STATES PATENTS

| 3,179,229 | 4/1965 | Nyqvist | 198/365 |
| 3,348,678 | 10/1967 | Flowers | 198/365 |

FOREIGN PATENTS OR APPLICATIONS

| 116,424 | 2/1930 | Austria | 198/365 |
| 175,802 | 6/1961 | Sweden | 198/365 |
| 204,770 | 3/1966 | Sweden | 198/365 |
| 343,554 | 3/1972 | Sweden | 198/365 |

Primary Examiner—Evon C. Blunk
Assistant Examiner—Jeffrey V. Nase

[57] ABSTRACT

A simple and efficient conveyor track apparatus for conveying logs using endless conveyor comprising a belt or chain and having stations for rolling off or displacing the logs laterally of the direction the conveyor is moving; the logs being displaced by pairs of upwardly movable lifting rails tiltably engaging an upper run of the endless conveyor in which the lifting wheels are operated and integrated by lengths connected to hydraulic fluid motors.

2 Claims, 2 Drawing Figures

CONVEYOR TRACK APPARATUS FOR LOGS

This is a continuation of application Ser. No. 615,057 filed Sept. 19, 1975 which in turn was a continuation of application Ser. No. 501,074 filed Aug. 27, 1974, both now abandoned.

FIELD OF THE INVENTION

This invention relates generally to conveyors for transporting logs and dislodging the logs at predetermined locations.

BACKGROUND OF THE INVENTON

An apparatus related to the invention is shown in the Swedish Pat. No. 204,770, in which each lifting rail is carried by links swingable in the transverse direction of the conveyer. It is evident from the FIG. 3 of the patent, that at the raising of a lifting rail this must slide laterally along the underside of the supporting means in question. Moreover, the patent shows a rather complicated construction for the transfer of the lifting movement from a motor to the links.

The Swedish Pat. No. 343,554 also shows an apparatus, related to the invention in which sections of the conveyer belt can be tilted laterally for the tilting of wanted supporting means. However, since the pivot axle of these sections is situated at a short distance below the supporting means at a lateral tilt of a section of the portion in question of the conveyer belt or chain the section will be brought very much to the side and lowered a little, which is evident from the FIG. 2 of the patent. This causes a violent bending of the conveyer belt or -chain, and besides that the risk exists, that portions of the conveyer belt or -chain will be influenced which for the time being will be situated on sections adjacent to a tilted section, so that a log resting on those portions will be rolled off on a place not wanted.

SUMMARY AND OBJECTS OF THE INVENTION

An object of the invention is to provide a more simple and efficient apparatus of the kind in question avoiding the difficulties above mentioned.

The present invention relates to an endless conveyor track comprising a pair of endless conveyors comprising belts or chains having connected thereto transverse supporting means including an upper contoured support surface which is acuate or relatively shallow opted to single, and pairs of lifting rails mutually parallel and disposed beneath portions of the upper runs of the endless conveyors, said lifting rails being selectively raised by means of integrating, articulated lengths operated by fluid motor means.

These together with other objects and advantages will become apparent from a consideration of the following disclosure, accompanied by the drawing forming a part thereof, in which:

DESCRIPTION OF A PREFERRED EMBODIMENT

Figure 1:
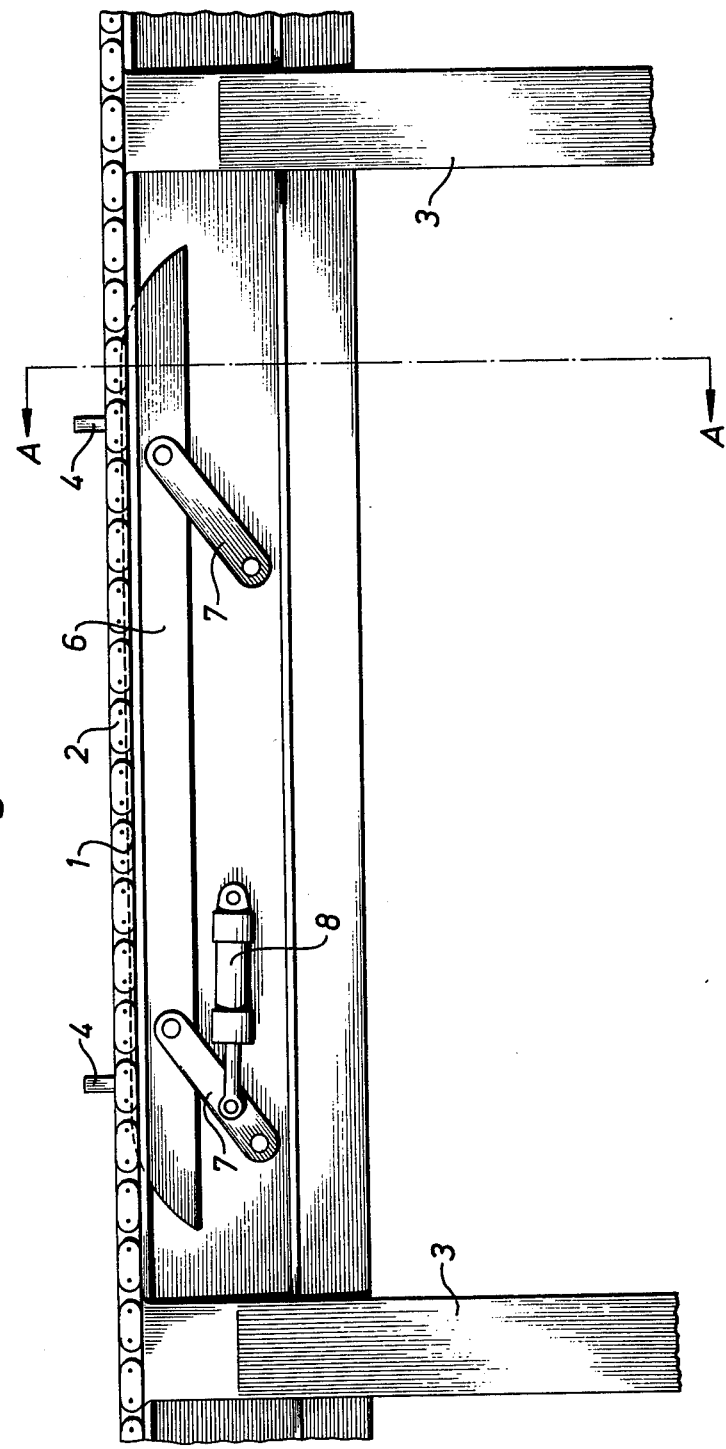
FIG. 1 is a side elevational view of a portion of the conveyor apparatus according to the invention.

A track apparatus for an endless conveyer belt or chain 2 is carried by trestles 3. The conveyer belt or chain is provided with transverse supporting means 4 equally distributed along the belt or chain and having an upright shallow outcarved (arcuate) supporting surface 5 or supporting surface with portions sloping towards each other in an obtuse angle, so that ordinarily a log, not shown and resting on at least two adjacent or successive supporting means will remain thereon and can be conveyed along the conveyor track. Along said conveyer track 1 are stations for the rolling off of logs and suitably these stations are arranged between adjacent trestles 3. Such a station is shown in FIG. 1 and has a pair of mutually parallel lifting rails 6 parallel to the conveyer track and known per-se and in addition to that lifting means for individually lifting of a lifting rail used for tilting the supporting means 4 situated above the lifting rails in order to cause a log to roll off at one side of the conveyor track when the log was resting on tilted supporting means.

Figure 2:
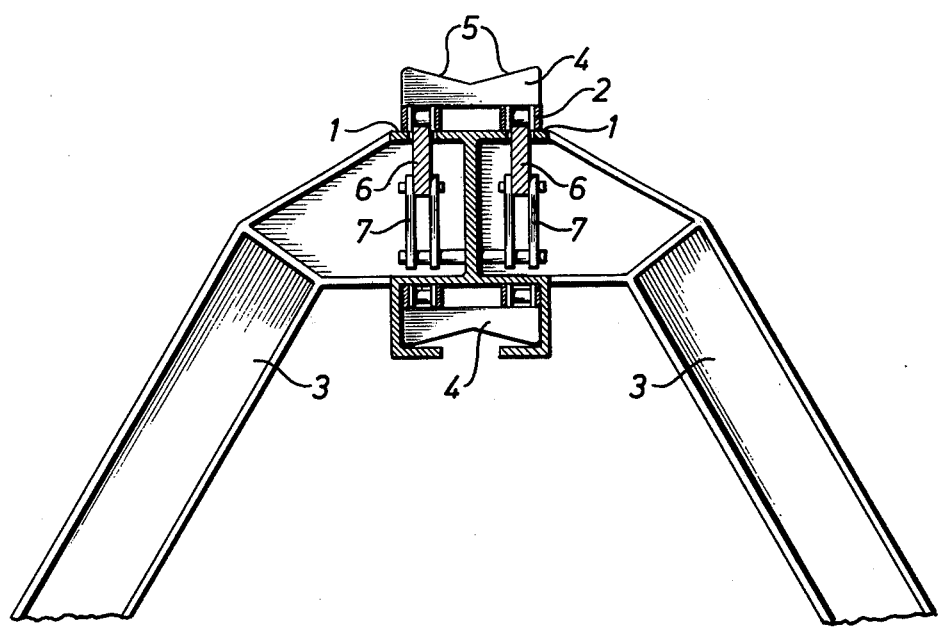
FIG. 2 is a vertical section taken substantially on the plane of line A—A of FIG. 1.

Each lifting rail is carried by at least two articulated lengths, swing upwardly in a vertical plane parallel to and beneath the lifting rails and which bear in accommodating portions of the bearing rails; see FIG. 2, it being noted that the lifting rails span at least two of these supporting means 4; see FIG. 1. The links 7 integrate movement of the rails 6 in parallel relation and are mechanically operated by suitable power means such as the fluid motor 8 comprising a hydraulic cylinder which has a piston rod pivotally and intermediately connected to at least one of the links 7 as seen in FIG. 1. Outward extension of the piston rod of the hydraulic cylinder 8 causes the link to pivot upwardly, thus causing the rail to raise in parallel relation beneath the upper run of the endless chain at one side of the supporting means 4; this causes a slight upward and lateral movement of the supporting means and a reduced stress to the run of the conveyor belt or -chain 2 and tends temporarily slow down movement of other supporting means, the tilting of which is not desired. Naturally each lifting rail has its own hydraulic cylinder 8.

The different hydraulic cylinders are operable from an operating central at the end of the conveyor track, where the logs are fed on to the conveyer belt or chain. The supporting means 4 can connect two parallel chains to a single chain 2.

The invention having been set forth, what is claimed as new and useful is:

1. In a conveying-and-discharge apparatus for elongated articles such as logs or the like, comprising in combination;
   A. an endless conveyor including a generally horizontal upper run, said endless conveyor comprising a pair of laterally-spaced, flexible elements disposed in the upper run of the conveyor, said endless conveyor including support elements secured to and bridging the laterally-spaced flexible elements for supporting elongated articles thereon, the support elements including an upper support surface having a shallow-recess for extending transversely of and stabilizing the elongated articles being conveyed;
   B. pairs of rigid, lifting elements disposed in mutually parallel relation with respect to each other and in vertical alignment with a respective flexible element of said conveyor, said lifting elements spaning a substantial length of the conveyor run;

C. pairs of articulated links pivotally connected between a fixed support and in longitudinally space relation to a respective rigid lifting element for restraining upward movement of the rigid lifting element in parallel relation relative to the conveyor run whereby upward movement of the rigid element will engage and raise one or the other of said flexible elements of the endless conveyor and tilt an elongated article laterally to one side or the other of the conveyor run; and D. means operatively connected to at least one of said pairs of articulated links operatively connected to a respective lifting element for pivoting said one link about the fixed support and causing the rigid lifting element to move vertically and discharge an article laterally off the conveyor.

2. The structure as claimed in claim 1 in which said flexible elements of the conveyor run comprise portions spanning and depending over top edge portions of the rigid, lifting elements, said rigid, lifting elements comprising plates beneath the respective flexible elements, said articulated links forming with the fixed support a parallelogram structure, said means operatively connected to at least one of said pairs of articulated links comprising a fluid motor.

* * * * *